(12) United States Patent
Koch

(10) Patent No.: US 6,296,683 B1
(45) Date of Patent: Oct. 2, 2001

(54) DRYER FOR COMPRESSED AIR

(75) Inventor: Berthold Koch, Neuss (DE)

(73) Assignee: BEKO Technologies GmbH, Neuss (DE)

( * ) Notice: Subject to any disclaimer, the term of this patent is extended or adjusted under 35 U.S.C. 154(b) by 0 days.

(21) Appl. No.: 09/402,509

(22) PCT Filed: Jan. 7, 1998

(86) PCT No.: PCT/DE98/00018

§ 371 Date: Oct. 5, 1999

§ 102(e) Date: Oct. 5, 1999

(87) PCT Pub. No.: WO98/45025

PCT Pub. Date: Oct. 15, 1998

(30) Foreign Application Priority Data

Apr. 10, 1997 (DE) .............................. 197 14 887

(51) Int. Cl.[7] .......................... B01D 53/22; B01D 53/26
(52) U.S. Cl. ................................ 95/23; 95/52; 96/4; 96/8
(58) Field of Search .............................. 95/45–56, 22, 95/23; 96/4, 8, 10

(56) References Cited

U.S. PATENT DOCUMENTS

| | | | |
|---|---|---|---|
| 3,735,558 | * | 5/1973 | Skarstrom et al. ............... 95/52 X |
| 4,718,921 | * | 1/1988 | Makino et al. ............... 95/52 |
| 4,931,070 | * | 6/1990 | Prasad ............... 95/52 |
| 5,002,590 | * | 3/1991 | Friesen et al. ............... 95/52 |
| 5,084,073 | * | 1/1992 | Prasad ............... 95/52 |
| 5,160,514 | * | 11/1992 | Newbold et al. ............... 95/52 X |
| 5,169,412 | * | 12/1992 | Prasad et al. ............... 95/52 X |
| 5,205,842 | * | 4/1993 | Prasad ............... 95/52 X |
| 5,259,869 | * | 11/1993 | Auvil et al. ............... 95/52 |
| 5,383,956 | * | 1/1995 | Prasad et al. ............... 95/52 X |
| 5,605,564 | * | 2/1997 | Collins ............... 95/52 |
| 5,641,337 | * | 6/1997 | Arrowsmith et al. ............... 95/52 X |
| 5,961,692 | * | 10/1999 | Collins ............... 95/52 X |
| 6,004,383 | * | 12/1999 | Kühnelt ............... 95/52 X |
| 6,070,339 | * | 6/2000 | Cunkelman ............... 95/52 X |
| 6,128,825 | * | 10/2000 | Cunkelman ............... 95/52 X |

FOREIGN PATENT DOCUMENTS

1440963 * 6/1976 (GB).

* cited by examiner

Primary Examiner—Robert H. Spitzer
(74) Attorney, Agent, or Firm—K. S. Cornaby

(57) ABSTRACT

The dryer for compressed air comprises a filter bowl (20), which has an inlet (22) for damp compressed air, an outlet (24) for dried compressed air, a scavenging air inlet (26) and a scavenging air outlet (28). A membrane is accommodated in the filter bowl (20). The membrane lets selectively water steam flow through and has two sides. One side of the membrane is stroked by the compressed air, while scavenging air flows on the other side of the membrane. A feeder pipe (32) is provided, through which dried compressed air coming from the outlet (24) is fed into the scavenging air inlet (26). A closing device (34, 36, 38) is arranged in the feeder pipe (32) and has a closed position. The closed position depends on the consumption of compressed air in such a way that more or less scavenging air is made available when more or less compressed air is taken by a consumer device, operated by dried compressed air.

15 Claims, 3 Drawing Sheets

DRYER FOR COMPRESSED AIR

Figure 1:
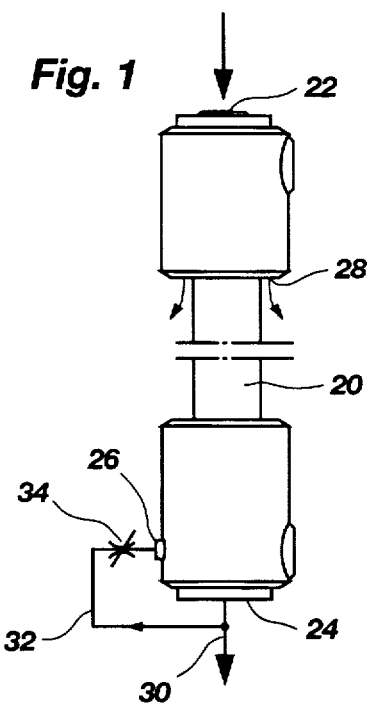

The invention relates to a dryer for compressed air, fitted with a filter bowl, a) presenting an inlet for damp compressed air, an outlet for dried compressed air, an inlet for scavenging air and an outlet for scavenging air, and b) in which is accommodated a membrane filter, fitted preferably with a bundle of hollow fibre membranes, on one side of said filter is stroked by the compressed air flow, while the scavenging air flows on the other side, particularly in the direction opposite to that of the compressed air. The filter bowl lets selectively water steam flow through and comprises a feeder pipe through which the compressed air, which is dried since it comes from the outlet, is introduced in a depressed state into the scavenging air inlet.

Such a dryer for compressed air is known from the U.S. printed patent specification 5,002,590. In the case of using compressed air, for example in industrial engineering or in medicine technology, the humidity in the network and at the places of consumption is a quality problem. Therefore, an important task is always the drying of the compressed air.

For this membrane filters are used, which selectively let water steam flow through. In the filter bowl, a bundle of highly selective hollow fibre membranes is fitted, through which compressed air flows. The damp compressed air is preferably filtered, so that dirt particles, oil mist and condensate, still present in the damp compressed air, are kept back, thus the hollow fibre membranes do not become clogged. Through the hollow fibre membranes, water steam diffuses to the outside. At the outlet for dried compressed air, a small partial flow of compressed air is branched off and used after the expansion as scavenging air. The scavenging air is led in counterflow to the compressed air via the outside of the hollow fibres. On account of the difference in the water steam concentration, a continuous conveyance of the water molecules is achieved from the compressed air into the scavenging air.

This procedure occurs continuously. The scavenging air continuously dries the entering damp compressed air. Only water molecules are able to penetrate the membranes of the hollow fibres. The composition of the dried compressed air remains unchanged. As result one has clean, dry compressed air.

Unfavourably, however, is the constant need of scavenging air. The scavenging air is, in accordance with the state of the art, branched off immediately from the compressed air; a part of the compressed air is thus constantly lost for the scavenging. Particularly the energy, put into the scavenging air, needed for the compression, is lost without purpose, because the branched off partial flow of the compressed air is expanded before it is fed into the scavenging air inlet.

This is where the invention starts. It is the problem of the invention to state a dryer for compressed air for the above mentioned kind, where the compressed air within the dryer is used more economically and where a larger part of the compressed air is available for a device, operated by compressed air.

Departing from the dryer of the above-mentioned kind, this problem is solved thus, that the feeder pipe is designed with closing means, the closed position of which depends on the consumption of compressed air.

According to the state of the art, scavenging air flows continuously through the filter bowl, irrespective of the case, whether or not compressed air is actually taken from the compressed air outlet or from the useful air outlet. In this way a noticeable part of the compressed air, made available, is lost. This invention proposes savings for this.

The invention follows essentially two paths: On the one hand it proposes to control the branched off compressed air flow, which is fed into the scavenging air inlet in such a way, that scavenging air is actually only then available, when compressed air is extracted from a device, operated by compressed air. For this the scavenging air flow is switched off in those rest periods, in which the device, operated by compressed air, is not used or it is at least regulated down in so far, that clearly less compressed air is used for the dehumidification. However, a control, depending on the extracted flow of compressed air is also possible by making more or less scavenging air available, when more or less compressed air is extracted for a series connected device, operated by compressed air.

On the other hand, this invention proposes to only take scavenging air behind a device, operated by compressed air, this means at its air outlet and to feed the scavenging air from there to the scavenging air inlet, as the case may be through the interposition of an air flow distributor and/or a fan.

In a particularly preferred embodiment, the closing means have its own drive, especially an electric, an electromagnetic, a hydraulic or pneumatic drive. Preferably the closing means are embodied as solenoid valve or as a device, operated by compressed air. On account of its own drive the closing means can be controlled, for example via an operating connection of a device, operated by compressed air, via a flow feeler fitted at the outlet on the way to a consumer or something of the kind.

As particular preferred it has proved to extract the scavenging air at the air outlet of a device, operated by compressed air. This device and the appropriate procedure have the advantage that no compressed air is lost for the scavenging, on the contrary, the complete compressed air, present at the outlet, is used for at least one device, operated by compressed air. Only behind the device, operated by compressed air, the scavenging air is actually extracted, especially the feeder pipe branches off, which supplies the scavenging air inlet with air. In the case of this embodiment the main pipe for the compressed air, which, according to the state of the art, supplies the device, operated with compressed air, and the feeder pipe run initially parallel and, as the case may be, only separate behind the device, operated by compressed air.

The last mentioned procedure complies with a serial arrangement of consumers, i.e. it complies with the device, operated by compressed air and with the scavenging air inlet as well as with the scavenging air outlet. According to the state of the art, in the contrary, a parallel arrangement is known, i.e. the splitting up of the compressed air flow immediately behind the outlet for dried compressed air and the supply of a main flow through a main pipe to the consumer as well as a branched off flow as scavenging air into the scavenging air inlet.

The series connection presumes, in accordance with the invention, that the consumer, operated by compressed air, does not pollute the compressed air itself, especially that it does not mix it with water. In addition, other impurities, such as for example oil or pollutants, would be harmful. Therefore it must be seen to, that the consumer, operated by compressed air, through which the compressed air flows before it finds use as scavenging air, is sealed accordingly and is carried out cleanly.

Although, in the case of the described serial arrangement, it is on principle possible to feed the complete air flow, which has flowed through the consumer, operated by compressed air, into the scavenging air inlet, a splitting of this air flow is preferred. For this a volume distributor is planned, which guides a partial flow to the scavenging air inlet, whilst another partial flow is discharged into the surroundings. This volume control can be controlled in such a way, that, depending on the compressed air consumption of the consumer, operated by compressed air, a more or less large share of the scavenging air is made available for the scavenging air inlet.

In the case of the series connection, in accordance with the invention in hand, the loss of pressure in the filter bowl and between scavenging air inlet and scavenging air outlet can unfavourably become apparent. In order to compensate for it, a number of ways are possible. First of all the scavenging air inlet, the cross-section for the flow of scavenging air and the scavenging air outlet must be efficiently dimensioned in such a way, that an as small as possible pressure drop arises in the filter bowl. Such filter bowls are then particularly suitable for the discussed series connection. Secondly, behind the device, operated by compressed air, it is however also possible to fit a fan or something of that kind, which intercepts the pressure drop. In this way it is assured, that the consumer, operated by compressed air, can work against the pressure zero and that only the air, flowing out at its air outlet, is extracted and driven again in such a way, that it can flow through the scavenging area of the filter bowl. If necessary, also an air collecting area or an equalising basin in the area of the feeder pipe can be used to level out pressure variations.

In the above-mentioned case, the consumer, operated by compressed air, is thus used as closing means in the sense of the invention in hand. Only if compressed air flows through the consumer, operated by compressed air, also scavenging air is available, which is extracted downstream from this consumer and, as a result, the drying of the compressed air takes place in the dryer. This has the advantage, that only then scavenging air is made available, when compressed air is actually extracted.

As a whole the invention leads to the situation, that substantially less primary compressed air is needed for the scavenging process in the dryer, than this is the case according to the state of the art. Either the flow of scavenging air, branched off immediately behind the outlet for dried compressed air, is connected or, as the case may be, is also controlled, so that an unnecessary rinsing of the scavenging area with scavenging air is potentially prevented, or the scavenging air is straightaway only extracted behind a consumer, operated by compressed air, where on the one hand, it is depressed and on the other hand it is still clean. From there it is fed into the scavenging area. In this case, the complete amount of compressed air, available at the outlet for dried compressed air, is solely available for the consumer, operated by compressed air. Subsequent it is available as scavenging air.

Preferably the dryer of the here discussed kind, is fitted immediately near a consumer, operated by compressed air. Typically and preferred, one dryer is allocated to each individual consumer, operated by compressed air. However, this does not rule out, that a number of consumers, operated by compressed air, can be served by one dryer.

Figure 2:
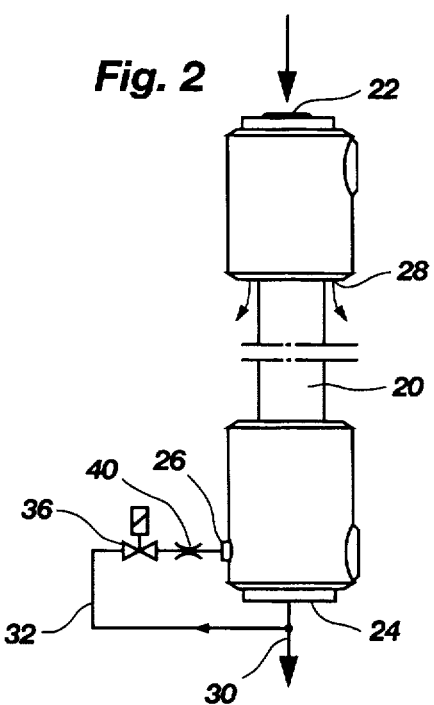
Figure 3:
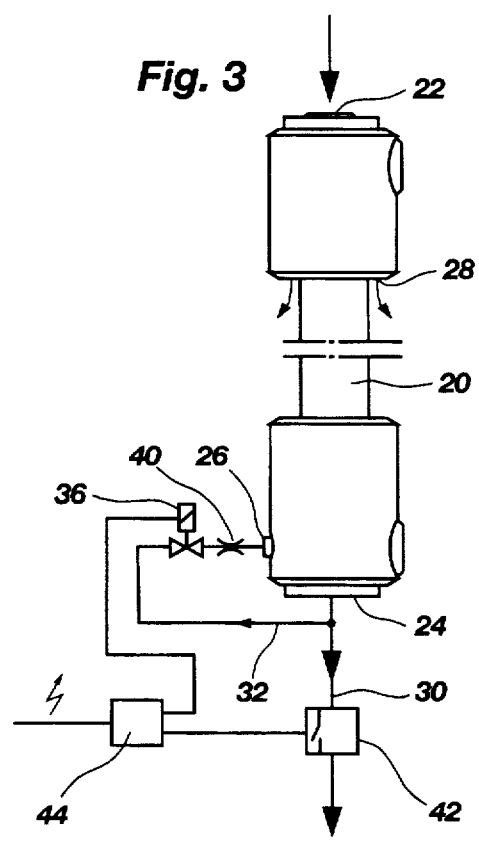
Figure 4:
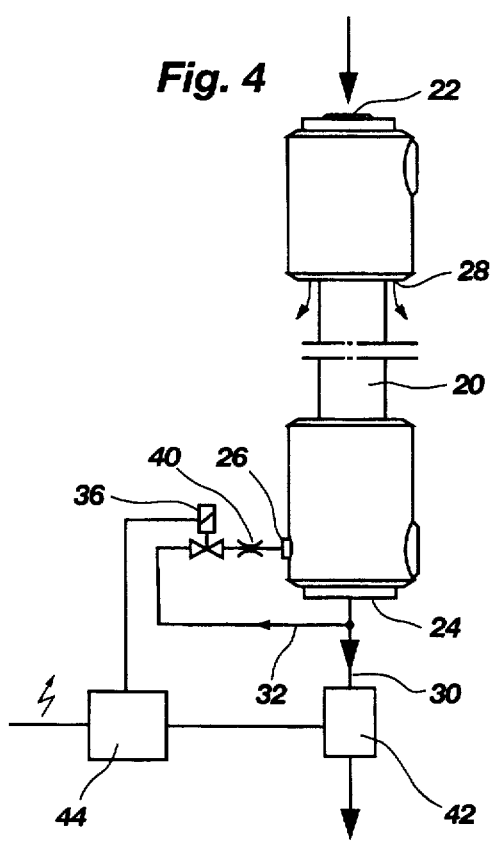
Figure 5:
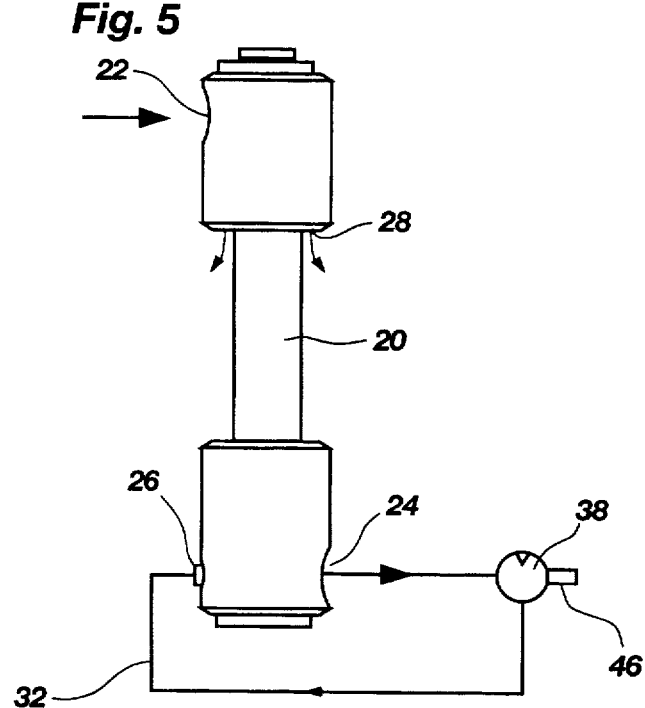
Figure 6:
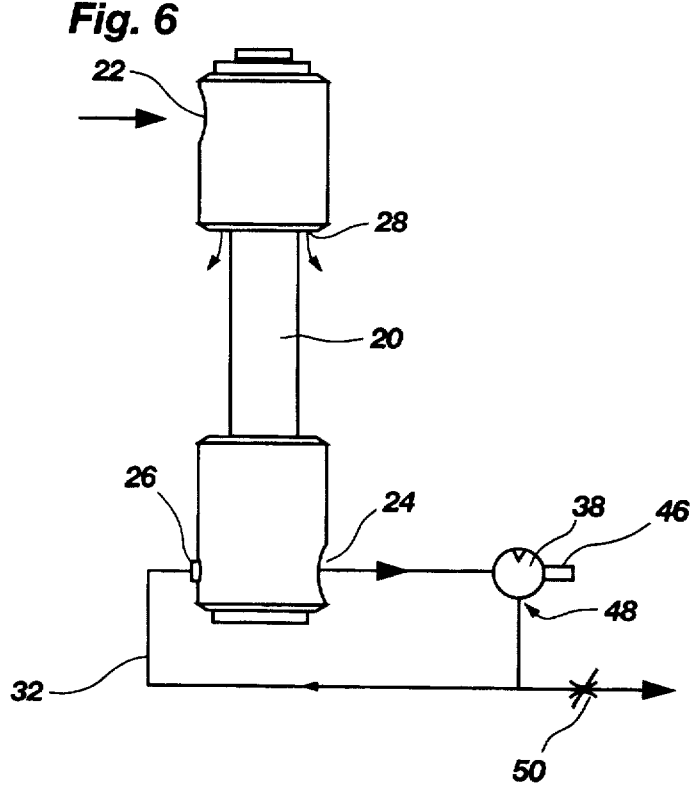
Figure 7:
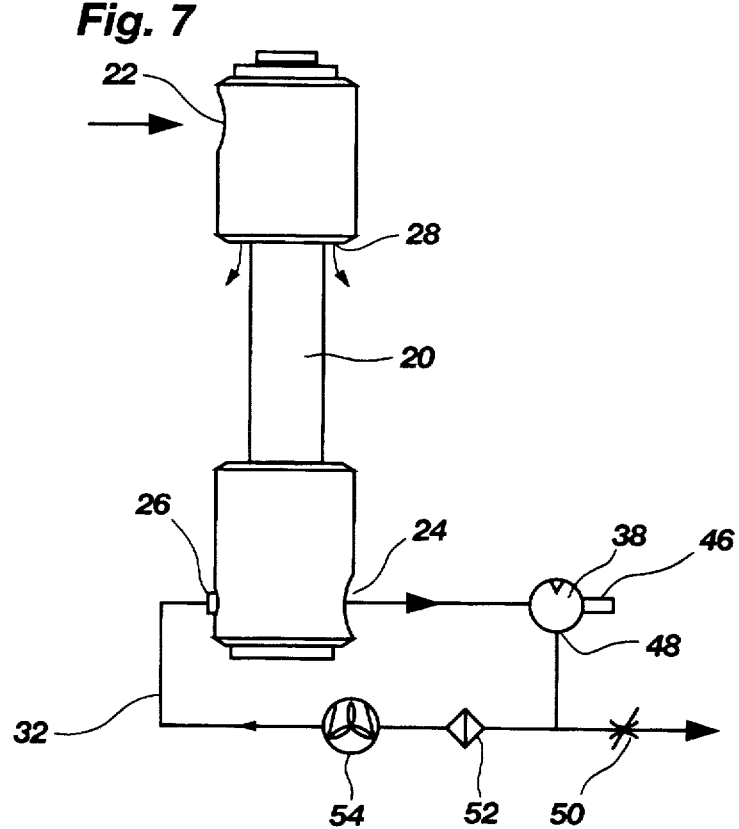
Figure 8:
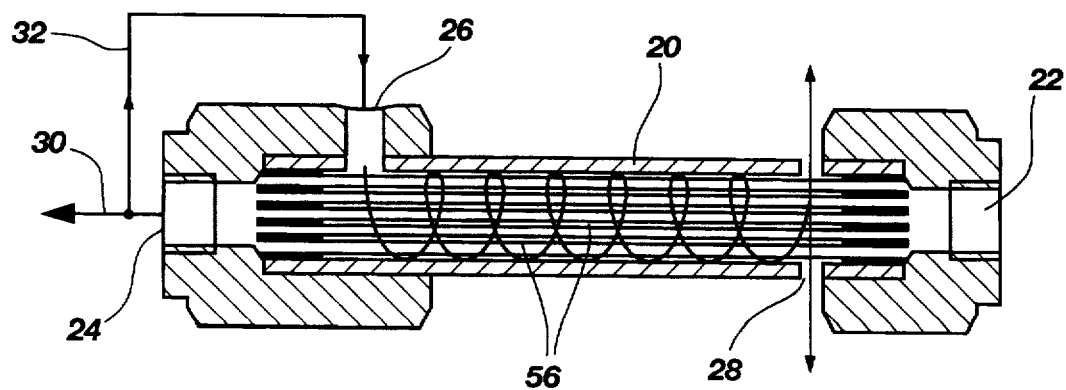

Further advantages and characteristics of the invention result from the remaining claims as well as from the now following description of embodiments, not to be understood as restrictive. These are explained in more detail with reference to the drawing. This shows:

FIG. 1: an illustration as top view of a dryer of the here discussed kind with a controllable flow resistance as closing means;

FIG. 2: an illustration according to FIG. 1, with a valve with actuating drive as closing means;

FIG. 3: an illustration according to FIG. 2, where the valve is now controlled via a control unit and, behind the outlet for dried compressed air, a flow feeler is fitted in form of a flow switch;

FIG. 4: an illustration according to FIG. 3, with a flow sensor instead of a flow switch;

FIG. 5: a dryer, which is fitted with a consumer, operated by compressed air at the outlet for dried compressed air. The scavenging air is extracted at the air outlet of this consumer; here a series connection is present;

FIG. 6: an illustration according to FIG. 5, but fitted additionally with a volume control in the area of the scavenging air;

FIG. 7: an illustration according to FIG. 5, but from now on with an additional fan in the area of the scavenging air; and FIG. 8: an illustration of a dryer as sectional drawing with relative large openings of valves in the area of the scavenging air flow, particularly suitable for a device according to FIGS. 5 to 7.

FIG. 1 shows a filter bowl 20, which has an inlet 22 for damp compressed air (upper large arrow); an outlet 24 for dried compressed air, a scavenging air inlet 26 and a scavenging air outlet 28. Compressed air is at the inlet 22, supplied by a compressed air system. Preferably this compressed air is processed through a fine strainer preceding the inlet 22 and, as the case may be, is treated by a steam trap.

At the outlet 24, the compressed air flow is split up. A main stream flows through the main pipe 30 towards a consumer, operated by compressed air, which is not illustrated here, but which is illustrated in FIG. 5. A small part flows through a feeder pipe 32 to the scavenging air inlet 26; this part represents the scavenging air. In the feeder pipe 32 there is, as actually known, a pressure regulating valve, which is here further developed as controllable flow resistance.

Depending on the need for compressed air in the main pipe 30, the controllable flow resistance is changed. If no compressed air is required in the main pipe 30, the controllable flow resistance or throttle 34 is closed. If there is much need for compressed air in the main pipe 30, the controllable flow resistance 34, is, accordingly, sufficiently wide opened.

If the throttle 34 is a manually adjustable throttle, in the practical application it is only adjusted towards a fixed operating point. From time to time this can be changed, for example in the case of a connection of different consumers. However, it can also be rigidly adjusted towards one operating point.

However, the throttle can also be otherwise adjustable. This is particularly dealt with in the following explanations. Thus the throttle 34, for example, can be power adjustable; one then arrives at a solution similar to FIG. 2.

In the embodiment according to FIG. 2, the pressure throttling function and the valve function of the adjustable flow resistance are separated. A solenoid valve 36 is provided, which is connected in series with a rigidly adjusted throttle 40. Depending on the compressed air requirement in the main pipe 30 the solenoid valve is opened, partially opened or closed.

The adequate control for the embodiments, according to FIG. 2, is illustrated in FIG. 3. In this case, a flow feeler 42 is fitted in the main pipe 30, which is designed as automatic control switch. A flow switch is understood as a control of an airflow with switching function. If a sufficient flow of compressed air flows through the main pipe 30, the flow feeler 42 switches, the solenoid valve 36 opens and scavenging air flows through the filter bowl 20. Otherwise, i.e. in the case of an insufficient consumption of compressed air, as for example existent in cases of leakage in the system or in the case of the compressed air consumption zero, the solenoid valve 36 is, via the flow feeler 42 and in connection with a control unit 44 completely closed, so that no scavenging air can flow through the feeder pipe.

To a great extent the embodiment, according to FIG. 4, complies with the one according to FIG. 3, but from now on a proportioning control is provided. Instead of a flow switch with only two control states, from now on a flow sensor is provided as flow feeler 42. It can, for example, be designed as wind wheel, whose number of revolutions per minute is detected. It can be a pendulum, hanging in the airflow, which is more or less deflected depending on the strength of the airflow. This deflection is for example collected via light and photoelectric receivers.

The bigger the compressed air flow in the main pipe 30 is, the bigger is the signal of the flow feeler 42, and the wider the solenoid valve opens. If no compressed air flow is detectable, the solenoid valve 36 stays closed, thus no scavenging air is made available.

The embodiment according to FIG. 5 shows a new, different attachment. A part of the compressed air immediately present at the outlet 24 is no longer used as scavenging air. In the contrary, the complete compressed air is made available for a consumer, operated by compressed air 38 and the scavenging air is only branched off downstream from this consumer. The consumer 38 then functions as closing means; it has, at the same time, also the function of the throttle 34 or 40.

In the illustrated embodiment according to FIG. 5, the consumer, operated by compressed air 38, is a pump or a similar driving device; a shaft 46 is driven. The kind of the consumer, operated by compressed air 38, does not matter. It can be designed at random. However, the design requirements set on it is to not load the compressed air, particularly not with water steam.

The embodiment according to FIG. 6 complies as far as possible with the embodiment according to FIG. 5, but a volume control is now provided. At the air outlet 48 of the consumer, operated by compressed air 38, initially the complete air, used in the consumer 38 and now largely in a depressed state is extracted; it is split into a partial flow, which is used as scavenging air and is directly fed into the scavenging air inlet 26 and into a partial flow, which is discharged, via a controllable resistance 50, into the atmosphere, see arrow. In this way, it is assured that only a part of the complete air, led through the consumer 38 as scavenging air, is used.

The embodiment according to FIG. 7 corresponds to the embodiment according to FIGS. 5 and 6, but additionally in the feeder pipe 32 another filter 52 and a fan 54 is now provided. On account of the fan 54 it is possible that the pressure, at the air outlet 48 of the consumer 38, can have the value zero. Fundamentally this is not necessary, because consumers must be operated with a difference of pressure and the pressure in the main pipe 30 is usually stronger than the difference of pressure, which is required for the consumer 38. Normally the remaining pressure can be used to flow through the scavenging area. However, if it is not available, for example due to long pipes, the fan 54 has the task to convey the air through the scavenging area.

With help of FIG. 8, a filter bowl 20 is explained, which is particularly designed for a low drop in pressure in the area of the scavenging air. In the known way, a multitude of hollow fibre membranes 56 is fitted. They are cast into holding devices at the end side in such a way, that at the end areas always solely their interior is accessible.

During the operation damp compressed air flows in from the right. It flows through the interiors of the individual hollow fibre membranes 56 and leaves again at the left-hand side. A part of the dried compressed air is fed, after adequate expansion (not illustrated), into the scavenging air inlet 26. This is so sufficiently proportioned that only a small drop in pressure arises at the inlet. The scavenging air flows corresponding to the helical line illustration of the arrows in FIG. 8 to the right, which means, in opposite direction to the compressed air. The scavenging air leaves at the scavenging air outlet 28. This as well as the area within the bowl 20 are proportioned sufficiently in such a way, that an as small as possible drop in pressure for the scavenging air arises.

What is claimed is:

1. Procedure for drying of damp compressed air with the following steps:
    allowing the damp compressed air to flow through a dryer, said dryer having a) a filter bowl (20), which comprises an inlet (22) for the damp compressed air, an outlet (24) for dried compressed air, a scavenging air inlet (26) and a scavenging air outlet (28) and b) a membrane, which is accommodated in said filter bowl and lets selectively water steam flow through, said membrane having two sides;
    allowing the damp compressed air to stroke one side of said membrane and scavenging air to flow on the other side in a direction opposite to that of the damp compressed air;
    connecting a consumer (38) to the outlet (24), said consumer (38) being operated by compressed air and having an air outlet (48), air arising at said air outlet (48);
    providing a feeder (32); and
    feeding at least a portion of the air arising at the air outlet (48) via said feeder (32) into the scavenging air inlet (26).

2. Dryer for compressed air, comprising
    a filter bowl (20), which has an inlet (22) for damp compressed air, an outlet (24) for dried compressed air, a scavenging air inlet (26) and a scavenging air outlet (28);
    a membrane, which is accommodated in said filter bowl (20) and which lets selectively water stream flow through, said membrane having two sides, one side of said membrane being stroked by the compressed air, while scavenging air flows on the other side of said membrane; and
    a feeder pipe (32), through which the dried compressed air coming from the outlet (24), is fed into the scavenging air inlet (26), a closing means (34, 36, 38) is provided, which is arranged in the feeder pipe (32), said closing means having a closed position, the closed position depending on the consumption of compressed air in such a way that more or less scavenging air is made available when more or less compressed air is extracted by a consumer.

3. Drying according to claim 2 wherein the closing means has its own drive.

4. Dryer according to claim 3, wherein a flow feeler (42) is provided, said flow feeler (42) being arranged behind the outlet (24) for dried compressed air and being fitted for sensing the dried compressed air flowing from the outlet (24) to the closing means (38), and wherein an output signal of the flow feeler (42) is applied to the drive of the closing means.

5. Dryer according to claim 4, wherein said flow feeler (42) is one of a flow switch and a flow sensor.

6. Dryer according to claim 4, wherein a control unit (44) is provided, the output signal of the flow feeler (42) being applied to the drive of the closing means through the interposition of said control unit (44).

7. Dryer according to claim 4, wherein the device operated by compressed air is a compressed-air operated tool.

8. Dryer according to claim 3, wherein said drive is one of an electrical drive, an electromagnetic drive, a pneumatic drive and a hydraulic drive.

9. Dryer according to claim 2, wherein the closing means has an open position in addition to the closed position, and has positions intermediate between the open and closed positions.

10. Dryer according to claim 2, wherein the closing means (38) connected to the outlet (24) for dried compressed air comprises an operating switch and wherein the operating switch is adapted to operate the closing means.

11. Dryer according to claim 2, wherein the closing means is a device which is operated by compressed air.

12. Dryer according to claim 11, wherein an air outlet (48) of the device, operated by compressed air (38) is connected with the scavenging air inlet (26) via a control device for air.

13. Dryer according to claim 12, wherein a volume control is provided, which volume control is fitted between the air outlet (48) of the device, operated by compressed air (38) and the scavenging air inlet (26).

14. Dryer according to claim 2, wherein said membrane is realized as a bundle of hollow fiber membranes.

15. Dryer according to claim 2, wherein the scavenging air flowing on the other side of the membrane flows in a direction opposite to the direction of the damp compressed air.

* * * * *